United States Patent [19]

Cross

[11] Patent Number: 5,796,595
[45] Date of Patent: Aug. 18, 1998

[54] INTERLEAVED CONTINUOUS FLYBACK POWER CONVERTER SYSTEM

[75] Inventor: David A. Cross, Wrestlingworth, England

[73] Assignee: Astec International Limited, Hong Kong, Hong Kong

[21] Appl. No.: 932,792

[22] Filed: Sep. 5, 1997

Related U.S. Application Data

[63] Continuation of Ser. No. 698,566, Aug. 14, 1996, abandoned, which is a continuation-in-part of Ser. No. 201,653, Feb. 25, 1994, Pat. No. 5,570,278.

[51] Int. Cl.$^6$ .................................................. H02M 3/335
[52] U.S. Cl. .................... 363/16; 363/21; 363/131; 363/71
[58] Field of Search .......................... 363/16, 20–26, 363/65, 71, 131, 133, 134

[56] References Cited

U.S. PATENT DOCUMENTS

| | | | |
|---|---|---|---|
| 4,481,565 | 11/1984 | Colton | 363/56 |
| 4,500,949 | 2/1985 | Prete | 363/28 |
| 4,665,357 | 5/1987 | Herbert | 323/361 |
| 4,914,561 | 4/1990 | Rice et al. | 363/126 |
| 4,958,268 | 9/1990 | Nagagata et al. | 363/16 |
| 4,959,764 | 9/1990 | Bassett | 363/16 |
| 5,008,795 | 4/1991 | Parsley et al. | 363/20 |
| 5,057,986 | 10/1991 | Henze et al. | 363/20 |
| 5,126,931 | 6/1992 | Jitaru | 363/21 |
| 5,130,561 | 7/1992 | Elliott et al. | 307/31 |
| 5,146,394 | 9/1992 | Ishii et al. | 363/16 |
| 5,402,329 | 3/1995 | Wittenbreder, Jr. | 363/16 |
| 5,430,633 | 7/1995 | Smith | 363/20 |
| 5,434,768 | 7/1995 | Jitaru et al. | 363/21 |
| 5,508,903 | 4/1996 | Alexndrov | 363/16 |

FOREIGN PATENT DOCUMENTS 0 474 312 A1  3/1992  European Pat. Off. ....... H02M 3/335

OTHER PUBLICATIONS

Carsten, Design Techniques for Transformer Active Reset Circuits at High Frequencies and Power Levels, *HFPC*, May, 1990, Proceedings, pp. 235–246.

Yoshida, et al., "Zero Voltage Switching Approach for Flyback Converter," *Fourteenth International Telecommunications Energy Conference*, Intelec '92 Oct. 4–8, 1992, pp. 324–329.

Watson, et al., "Characterization of an Active Clamp Flyback Topology for DC/DC Conversion and Power Factor Correction Appliances," *Proceedings of the APEC '94 Ninth Annual Applied Power Electronics Conference*, Feb. 13,1994, pp. 412–418.

Hua, et al., "Development of a DC Distributed Power System," *Proceedings of the APEC '94 Ninth Annual Applied Power Electronics Conference*, Feb. 13, 1994, pp. 763–769.

David aliniak, "Modular DC–DC Converter Sends Power Density Soaring," *Electronic Design*, Aug. 21, 1995, pp. 59–64.

*Primary Examiner*—Peter S. Wong
*Assistant Examiner*—Y. J. Han
*Attorney, Agent, or Firm*—Coudert Brothers

[57] ABSTRACT

An interleaved flyback electrical power converter system having a plurality of flyback power converters operated in continuous mode, each converter utilizing a power switch operated under zero voltage switching conditions. The interleaved flyback power converter system is highly efficient and compact, and is suitable for use in high power, high frequency applications.

32 Claims, 5 Drawing Sheets

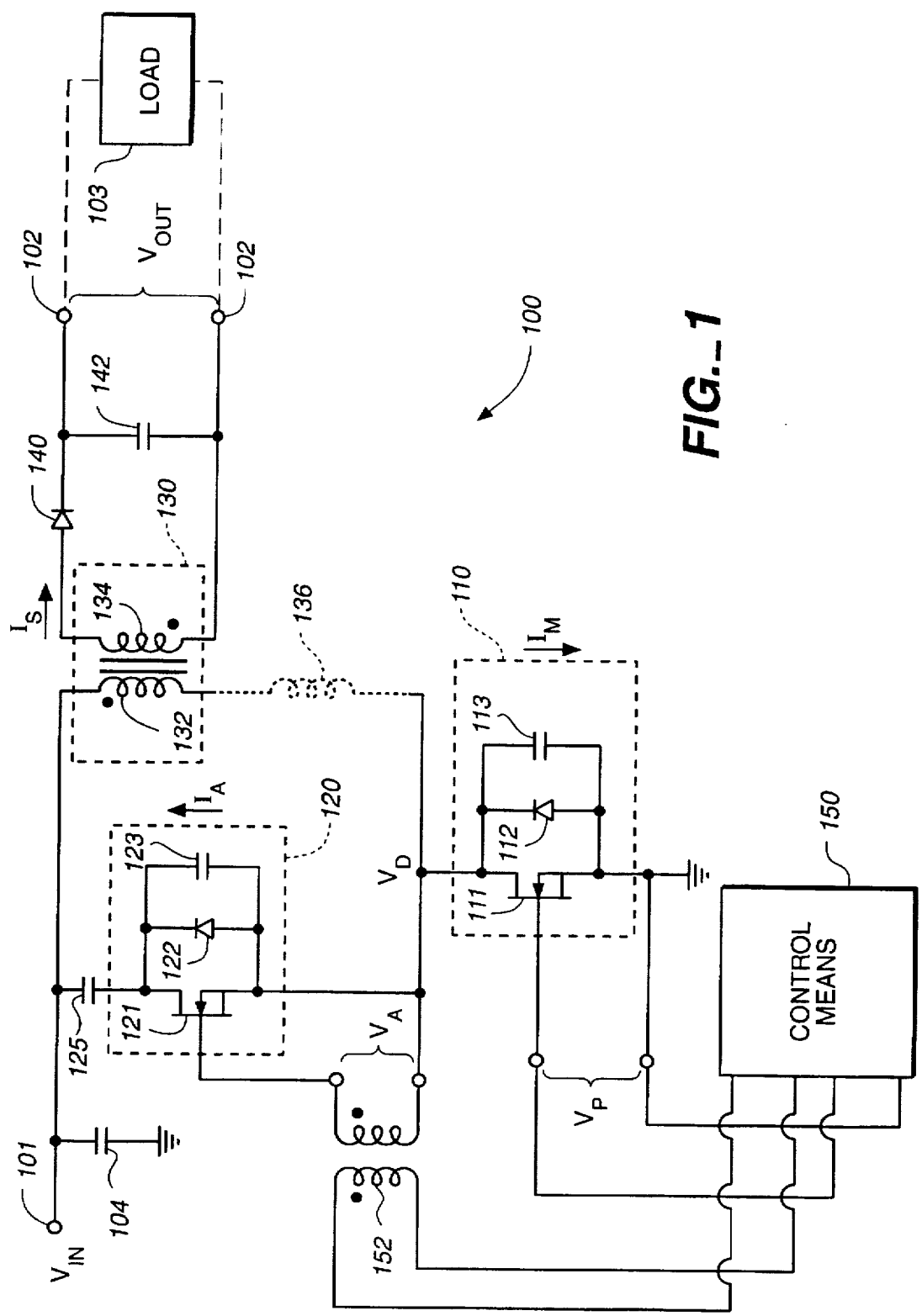
FIG._1

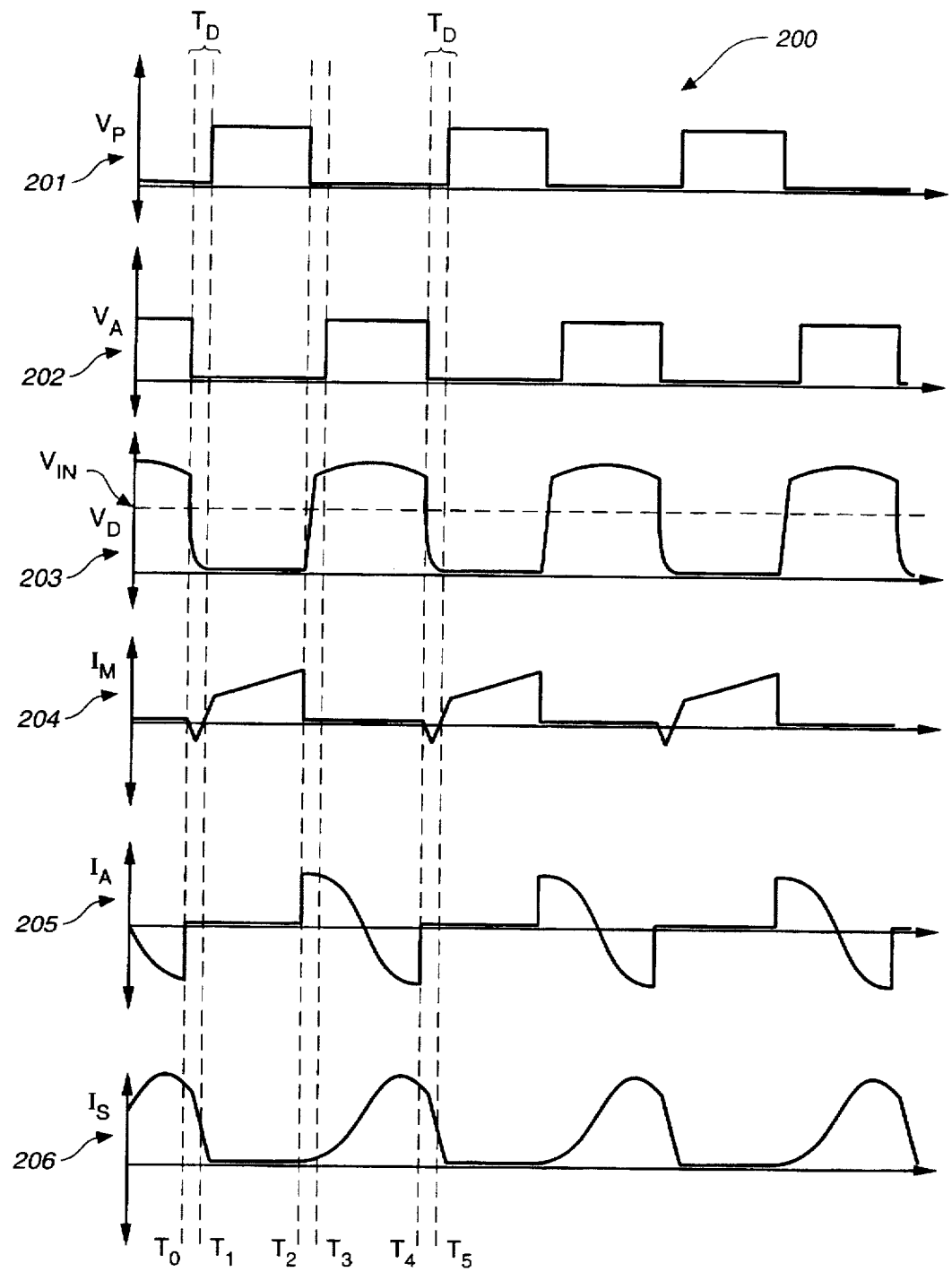
FIG._2

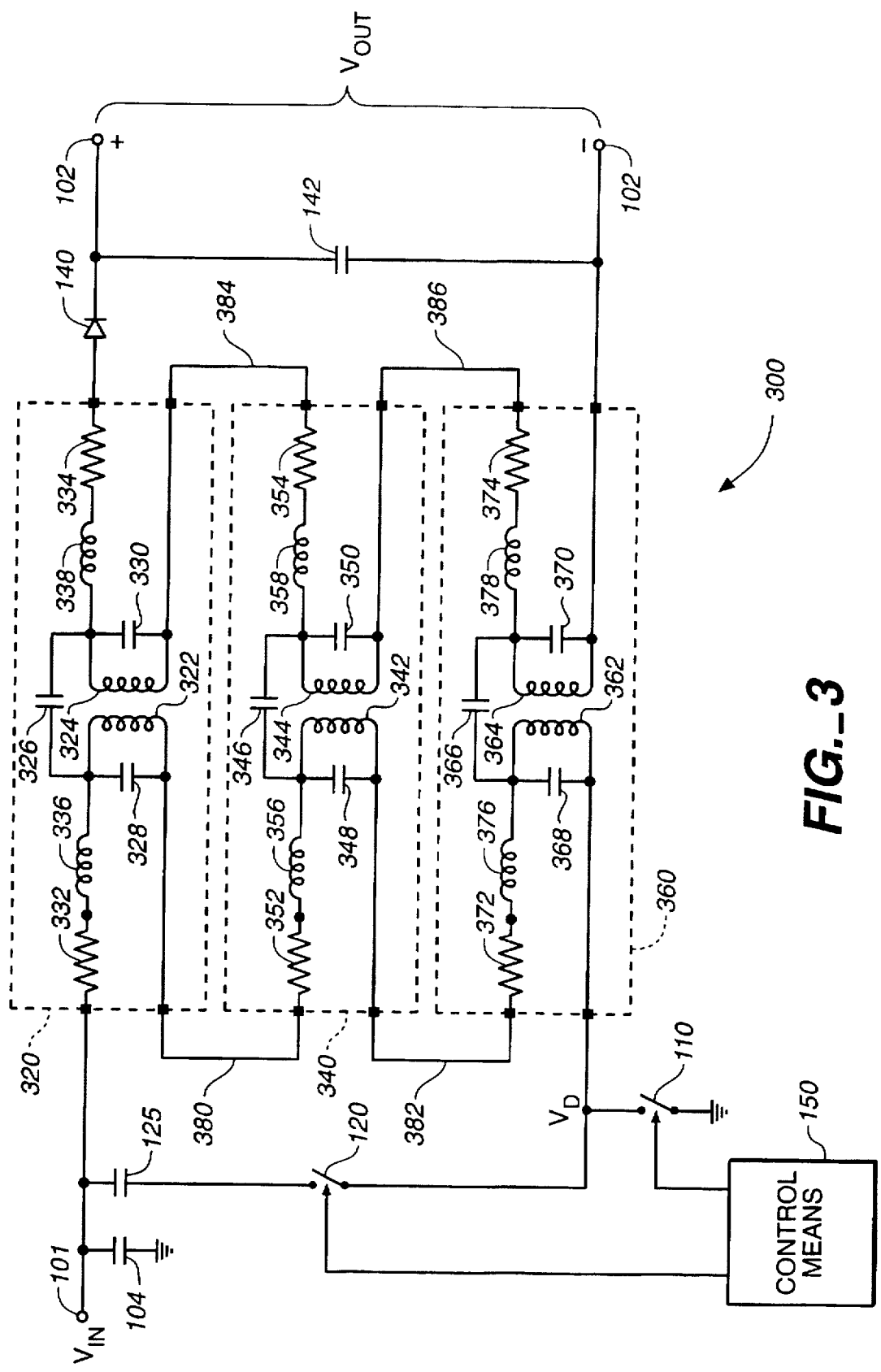
FIG._3

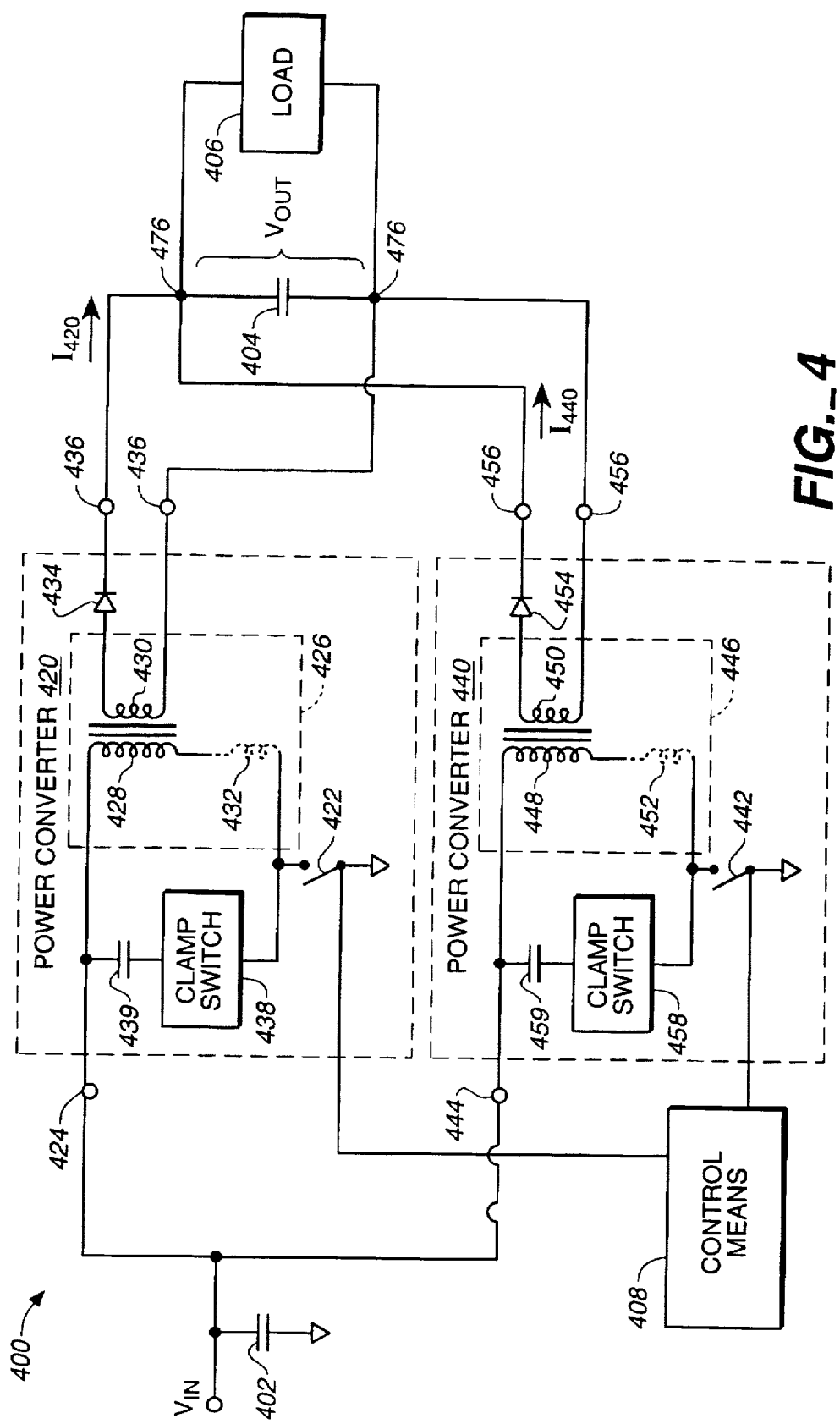
FIG._4

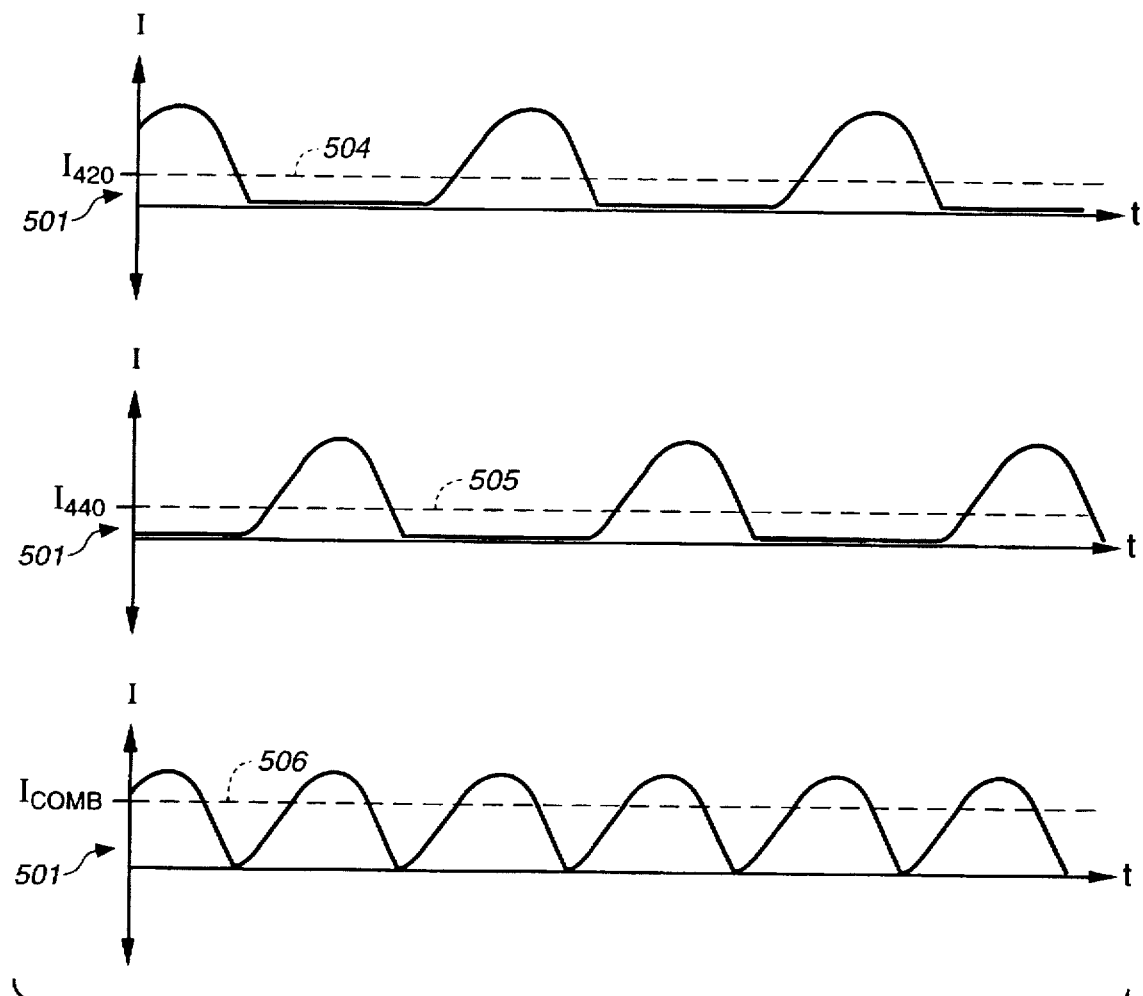
FIG._5

INTERLEAVED CONTINUOUS FLYBACK POWER CONVERTER SYSTEM

This is a continuation of application Ser. No. 08/698,566 filed Aug. 14, 1996, now abandoned, which is a continuation-in-part, of application Ser. No. 08/201,653 filed Feb. 25, 1994, now U.S. Pat. No. 5,570,278, which issued on Oct. 29, 1996.

FIELD OF THE INVENTION

The present invention relates to switching power supplies and, more particularly, to an interleaved continuous flyback power converter system having improved efficiency, high power density, and reduced output ripple current.

BACKGROUND OF THE INVENTION

Electrical power converters are devices for processing electrical power from one form, such as an AC or unregulated DC voltage, into another form, such as one or more regulated DC output voltages. One conventional type of electrical power converter that produces a regulated output voltage is a switching power supply, also commonly referred to as a switch mode power supply or a switched power supply.

Conventional switching power supplies commonly include a power transformer and one or more power switches for alternately coupling an unregulated DC or rectified AC voltage across a primary winding of the power transformer in a series of voltage pulses. These pulses are converted into a series of voltage pulses across one or more secondary windings of the power transformer and then rectified and filtered to provide one or more output DC voltages. The output voltage or voltages of the power converter are commonly regulated by controlling the relative amount of time that the power switch is on (i.e., the duty cycle).

One common type of switching power supply is the flyback power converter, also referred to as an energy storage converter. A flyback power converter works by cyclically storing energy in the power transformer, and then dumping this stored energy into a load. By varying the amount of energy stored and dumped per cycle, the output power can be controlled and regulated. A high power switching transistor connected in series with the primary winding of the power transformer normally provides such a switching function. That is, the on-time and off-time of this power switch controls the amount of energy coupled across the power transformer. When the power switch is on, current flows through the primary winding of the power transformer, and energy is stored in the transformer. When the power switch is off, the stored energy is transferred out into a secondary circuit by means of current flowing out of one or more secondary windings of the power transformer. Note that the secondary current does not flow in the power transformer at the same time that the power switch is on and the primary current is flowing. The reason for this is that in a conventional flyback power converter, a rectifier is coupled to the secondary winding to prevent conduction of current in the secondary winding when the power switch is on.

More specifically, at the beginning of each switching cycle of a conventional flyback power converter, the power switch turns on and couples an input voltage across the primary winding such that current in the primary winding ramps up from zero, thereby storing magnetic energy in the power transformer. The period of time during which the power switch is on is referred to as the drive cycle or drive period. After the power switch is turned off, current through the primary winding is sharply reduced and the voltage across the transformer windings reverses. Reversing the voltage across the secondary winding forward biases the secondary-side rectifier and allows current to be conducted through the secondary winding, thereby releasing the energy stored in the power transformer. This secondary current initially quickly reaches a relatively high value and then decreases over time as energy from the transformer is released. The voltage across the secondary winding initially reaches a high reverse value and decreases slowly during the flyback cycle. The energy from the transformer is coupled to and stored on an output capacitor to produce the desired output voltage. The period of time during which energy is released from the secondary winding is referred to as the flyback cycle or flyback period.

There are two main types of flyback converters. In most conventional flyback converters, the energy stored in the transformer is totally coupled to the output load before the next drive cycle, generally resulting in the secondary current reaching zero during the flyback cycle. Such flyback converters generally are referred to as discontinuous flyback converters. By contrast, in continuous flyback converters, the next drive cycle begins before all stored magnetic energy is released from the transformer, and therefore before the secondary current reaches zero. Discontinuous flyback converters are more common than continuous flyback converters because relatively simple control circuitry can be used to maintain output voltage regulation by varying the frequency and/or on-time of the power switch to accommodate heavy or light load conditions.

Flyback power converters are advantageous at lower power levels over other switching power converters due to the fact that they are generally simpler, they require a reduced number of components, and they allow multiple regulated outputs to be available from a single supply. Common applications for flyback converters are AC adapters, which may, for example, deliver an output voltage in the range of between 9 VDC to 24 VDC at power levels of 20 to 50 Watts, drawing power from a rectified AC mains, which may vary between 85 VAC to 270 VAC. One reason flyback converters are preferred to other converters for these applications is that they do not require an output choke under these voltage and power conditions.

Conventional flyback converters generally are not used at high power levels, especially at high switching frequencies, because they have many disadvantages that become particularly troublesome under such conditions. In fact, flyback converters are rarely used at power levels exceeding 100 or 200 Watts.

A first disadvantage of using a flyback power converter in high power applications is that flyback converters for such applications are often undesirably bulky. This is due to the need to use bulky transformers, which are typically necessary to store the high amounts of energy that must be transferred from the primary to the secondary of the transformer. One way to allow for smaller transformers is to incorporate an air gap of some appreciable size into the transformer core. The air gap allows greater current capability in the transformer before saturation of the core and, therefore, increases the energy-storage capabilities of a given sized transformer. An air gap, however, generally results in a relatively large leakage inductance, which causes a number of well-known problems including reduced power conversion efficiency. The size of the transformer can also be reduced by operating the flyback converter at high power switching frequencies, so that current conducted through the transformer windings is less likely to reach a level sufficient to cause saturation. As is well known, however, high switching frequencies (e.g., 200 KHz to 2 MHz) can lead to excessive power dissipation in the power switch.

A second disadvantage of using flyback power converters at high power levels is that flyback converters generally have poor power conversion efficiency and high power dissipation under such circumstances. As noted above, the relatively large leakage inductance caused by the air gap in the transformer core is one factor that decreases the power conversion efficiency of the flyback in comparison to other converters. When the power switch is turned on, energy is stored in both the transformer's core (the magnetizing inductance) and in the leakage inductance. When the power switch is turned off, the energy in the core (magnetizing inductance) is coupled to the secondary circuit, but the energy stored in the leakage inductance rings with the capacitance of the power switch, and is conventionally dissipated in a voltage clamping or "snubber" circuit connected to the power switch. In a discontinuous mode flyback converter, this dissipated energy can easily be as much as ten percent (10%) of the energy transferred to the secondary circuit when using a safety isolated transformer.

Another factor that decreases the power conversion efficiency is the relatively large root-mean-square (RMS) current that flows in the secondary winding during the flyback period. As is known in the art, the current through the secondary winding during the flyback period has a waveform that begins at a value substantially equal to the magnetizing current flowing in the primary winding at the end of the drive period times the transformer turns ratio and decreases substantially linearly to a lower value (in a discontinuous converter the secondary current falls to zero). Because the current waveform has a high initial current value, it has a relatively high RMS value in comparison to a current waveform with lower peak current transferring the same amount of energy. As is known in the art, the resistive losses ($I^2R$) in the secondary winding and secondary circuit are proportional to the square of the RMS current. Discontinuous flyback converters result in particularly high power losses because, for a given output power, the initial peaks must be much higher than the current peaks necessary in continuous flyback converters.

A further factor that decreases the power conversion efficiency of a conventional flyback converter are power dissipation losses that occur in the power switch and other semiconductor components when they are switched. Power switches commonly are metal-oxide semiconductor field-effect transistors (MOSFETs or FETs), although other types of transistors (such as bipolar junction power transistors, BJTs) are sometimes used. FETs are preferred because they can accommodate higher switching frequencies than most bipolar power transistors. However, a measurable amount of power is dissipated in the FET when it is turned on, because the drain voltage takes a finite time to decrease to near zero while drain current is flowing. The drain voltage starts at a value of at least the input voltage. If there is a reverse voltage across the transformer at the beginning of the drive cycle, the drain voltage value is higher than the input voltage. Similarly, at the beginning of each flyback cycle, the secondary-side rectifier becomes forward biased and high current begins to flow immediately, resulting in high power losses during the forward recovery time. Finally, at the beginning of each drive cycle in continuous flyback converters, turning on the power switch causes the secondary-side rectifier to quickly become reverse biased, with very high rates of change in the voltage across and current through the secondary-side rectifier during the reverse recovery period. As is well-known, this fast changing current and voltage during the reverse recovery period results in high reverse recovery power losses in the rectifier. It also results in the generation of unwanted noise which may exceed EMI standards or otherwise cause disruption in other circuits or devices.

In prior art discontinuous flyback converters, turn-on losses have been reduced by implementing "zero voltage switching," that is, by reducing the drain voltage of the FET to approximately zero before it is turned on. It is possible to implement zero voltage switching in discontinuous flyback converters because there is sufficient time to reduce the voltage across the FET to zero during the relatively long flyback cycle. For example, a conventional active clamp can be placed in parallel with the primary winding to create a resonant circuit. Energy stored in the leakage inductance is transferred to the clamp capacitor and back to the primary winding during the flyback cycle, causing a fluctuation in the voltage across the power switch. The circuit is timed such that the voltage across the power switch is zero at the time the flyback cycle concludes. Reduction of this voltage across the power switch is enabled in discontinuous flyback converters because the reverse voltage across the primary winding during the flyback cycle naturally falls to a low value when all magnetic energy has been released from the transformer at the end of the flyback cycle. Zero voltage switching, however, does not alleviate the problem of power dissipation due to high current peaks in the secondary winding of a discontinuous flyback converter.

One example of a prior art reference that discloses a discontinuous flyback power converter with zero voltage switching is U.S. Pat. No. 5,057,986 issued to Henze, et al. The Henze, et al. reference discloses the use of a clamp switch and a clamp capacitor to achieve zero voltage switching in a discontinuous flyback converter. As noted previously, however, it is much easier to achieve zero voltage switching in discontinuous converters than in continuous converters where the reverse voltage across the primary winding does not fall to a value close to zero volts as not all of the magnetic energy is released from the transformer at the end of the flyback cycle.

Henze, et al. also teaches interleaving two discontinuous flyback power converters. However, Henze, et al. only uses one clamp capacitor in conjunction with two clamp switches. The use of only one capacitor, instead of two where each capacitor is only associated with only one clamp switch and converter, is counter to the objective of achieving zero voltage switching. Additionally, the converters in the Henze, et al. system are restricted to a duty ratio (the ON time of the power switch divided by the ON and OFF time of the power switch) of less than 50% because of possible cross-conduction (i.e. simultaneous conduction) between the clamp switches and the power switches when operating at a duty ratio of 50% or more. Additionally, use of only one clamp capacitor in conjunction with the two clamp switches necessitates use of synchronous switches rather than ordinary rectifiers in the secondary circuit. Consequently, Henze, et al. uses secondary switches that operates synchronously with the clamp switch instead of rectifiers as used in the present invention. The use of a secondary switch that operates synchronously with the clamp switch further complicates the control mechanism for the power system. Furthermore, Henze et al., does not teach the sinusoidal shaping of the secondary current waveforms, which is a feature of the present invention. Moreover, because the Henze, et al., system operates in discontinuous mode, it has higher current ripples and, therefore, greater conduction losses than a flyback system operated in continuous mode. Finally, discontinuous mode converters, such as those disclosed in Henze, et al. are not suitable for high power conversion as they suffer from severe conversion inefficiencies.

A third disadvantage of using discontinuous flyback converters in high power applications is that adverse effects result from the high peak currents, discussed above, and from the high secondary voltage spike which is generated at the beginning of each flyback period due to the high leakage inductance. The high peak currents may damage many semiconductor components and capacitors and, thus, design choices for these components are limited. The secondary voltage spike results in output voltage noise which must be filtered by a bulky choke in order for the converter to meet conventional output voltage noise specifications. In fact, under high power conditions, the output voltage waveform of a flyback converters often has undesirably high harmonic content that must be filtered even if the leakage inductance produced spike is not considered.

The above discussion of disadvantages of prior art flyback power converters includes several references to problems associated with the secondary current waveform of such converters. A key disadvantage associated with the secondary current waveform in such power converters is that the secondary current waveform generally includes a substantial "output ripple current" caused by the fact that the converter switches in a periodic fashion between its drive and flyback cycles. As used herein, the term "output ripple current" can be viewed as the periodic deviations of the secondary current from the average DC current being drawn by the load. As is well known in the art, high RMS ripple currents result in high $I^2R$ power losses.

An additional problem related to high amounts of ripple current is that there are substantial periods of time in which no secondary current is delivered to the output capacitor of the power converter. Specifically, during the drive cycles of a flyback power converter, no current flows through the secondary winding to the output capacitor. Consequently, there is "zero power contribution" from the power converter to the output capacitor during these time periods. During zero power contribution periods, the output capacitor will continue to provide the output current required by the load while receiving no current from the power transformer, which results in fluctuations in the output voltage stored on the output capacitor, which fluctuations are known as "output ripple voltage." As is well known, this places stress on the output capacitor.

One way of reducing some problems associated with ripple current is to place a conventional choke in the secondary circuit of the power converter. A secondary choke reduces some of the disadvantages associated with ripple current by evening out the current flow into the output capacitor. Adding such an output choke, however, results in lower power density. To provide the desired amount of inductive filtering, the choke is typically undesirably bulky. Higher power converters generally require large chokes. In addition, power converters with a choke have an increased component count due to the choke being included. For all of the above reasons, high power converters with secondary chokes are often undesirably bulky and expensive.

The present invention is directed toward improving the performance of flyback power converters in each of the above areas.

SUMMARY OF THE INVENTION

Broadly stated, the present invention encompasses a flyback power converter system for providing power to a load. The flyback power converter system comprises a plurality of flyback power converters coupled in parallel to an output port (for coupling to an output load), wherein each of the power converters is operated at 360 divided by N degrees out of phase with another converter in the system (where N is an integer greater than one and represents the number of converters coupled in parallel to the output port).

Each flyback power converter has an input port for receiving an input voltage; a transformer having a primary winding and a secondary winding, wherein a first terminal of said primary winding is coupled to a first terminal of said input port and further wherein a second terminal of said secondary winding is coupled to a second terminal of said output port; a power switch, said power switch having first and second conduction terminals, wherein voltage across said first and second conduction terminals defines a switch voltage, and further wherein said first conduction terminal of said power switch is coupled to a second terminal of said primary winding and said second conduction terminal of said power switch is coupled to a second terminal of said input port, said power switch being switched to alternating ON and OFF states, wherein power is coupled from said input port to said primary winding during said ON states and wherein substantially no power is coupled from said input port to said primary winding during said OFF states, said transformer storing energy during said ON states and releasing energy to the output port during said OFF states, further wherein said switch voltage is substantially zero volts when said power switch is switched to said ON state from said OFF state; a series combination of a clamp capacitor and a clamp switch, said series combination having one terminal coupled to the first terminal of said input port and the first terminal of said primary winding, said series combination having a second terminal coupled to said second terminal of said primary winding, said clamp switch having an auxiliary ON state and an auxiliary OFF state; and a rectifier, wherein a first terminal of said rectifier is coupled to a first terminal of said secondary winding and a second terminal of said rectifier is coupled to a first terminal of said output port such that current is substantially blocked from flowing from said output port to said secondary winding during said ON states of the power switch and is enabled to flow to said output port during said OFF states.

In a preferred embodiment of the present invention, the rectifier is forward biased during said OFF state to enable a secondary current to be conducted in said secondary winding during said OFF state and reverse biased during said ON state to prevent said secondary current from being conducted during said ON state.

The power system further comprises an output capacitor coupled to said output port; and control means coupled to each of said clamp switches and each of said power switches for switching said power and clamp switches between said ON and OFF states and said auxiliary ON and OFF states, respectively.

In a preferred embodiment of the present invention, the output capacitor receives electrical energy provided to said output port of each of said power converters. Additionally, the output capacitor generates an output voltage that is a function of the amount of electrical energy received from each said power converter and the amount of output power provided to the load. Moreover, the output capacitor receives electrical energy substantially from only one of said power converters at any given time. Furthermore, said output capacitor is preferably a multilayer plastic capacitor which has low equivalent series resistance (ESR) particularly at higher frequencies ranges in which the flyback power converters of the present invention operate.

In a preferred embodiment, each transformer of each said power converter comprises a plurality of series-connected transformers.

In one preferred embodiment, the power system of the present invention contains two interleaved flyback power converters which are coupled in parallel to an output port. The two power converters are preferably operated at 180 degrees out of phase with respect to each other.

Accordingly, it is an object of the present invention to reduce the power dissipation and to improve the power conversion efficiency of flyback converters.

Another object of the present invention is to improve the compactness of flyback converters.

Still another object of the present invention is to allow for zero voltage switching of the main power switch in continuous flyback converters.

Yet another object of the present invention is to capture and reuse the energy stored in the primary winding leakage inductance of a continuous flyback converter.

A further object of the present invention is to reduce the resistive conduction losses and RMS currents in the secondary winding circuit of a flyback converter.

A still further object of the present invention is to provide a high power, high efficiency, low volume power converter.

Yet a further object of the present invention is to limit high harmonic content in the output voltage of a flyback power converter.

A further object of the present invention is to provide a continuous flyback power converter having a reduced level of EMI in the secondary circuit at the beginning of each drive cycle, and a reduced level of EMI overall.

These and other objects of the present invention will become apparent to those skilled in the art from the following detailed description of the invention, the accompanying drawings, and the appended claims.

BRIEF DESCRIPTION OF THE DRAWINGS

FIG. 1 is a schematic diagram of a first embodiment of a flyback converter.

FIG. 2 is a timing diagram of selected voltages and currents of the flyback converter shown in FIG. 1.

FIG. 3 is a schematic diagram of a second embodiment of a flyback converter.

FIG. 4 is a schematic diagram of an interleaved flyback power converter system according to the present invention.

FIG. 5 is a timing diagram of selected voltages and currents of an interleaved flyback converter system according to the present invention.

DETAILED DESCRIPTION OF THE INVENTION

The present invention comprises an interleaved flyback electrical power converter system. The system preferably includes two flyback electrical power converters operating in continuous mode and having power switches operated under zero voltage switching conditions. The two flyback electrical power converters are coupled in parallel and are operated 180 degrees out of phase with one another. The interleaved flyback power converter system is highly efficient and compact, and is suitable for use under high power, high frequency conditions.

The present invention first recognizes that continuous flyback converters operating at high frequencies will have much lower secondary current peaks than discontinuous power converters having the same output power level, resulting in lower $I^2R$ power losses in the secondary circuit. Thus, by providing a means of implementing zero voltage switching in a continuous flyback converter and reducing other common power losses, the present invention provides a power converter that is much more efficient than conventional flyback power converters. The present invention may also be implemented in a relatively compact manner with a relatively low component count.

Zero voltage switching has not previously been available in prior art continuous flyback converters. Attempts to provide zero voltage switching have failed. One reason for this is a relatively large amount of energy remains stored in the transformer core during the flyback cycle, and this results in the primary current jumping quickly to a relatively high value at the beginning of each drive cycle, allowing less time for the voltage across the power switch to be reduced to zero. It is difficult to reduce this switch voltage to zero in the relatively short flyback cycle of continuous flyback converters, especially those operating at high frequencies. Additionally, a higher reverse voltage remains across the primary winding of the continuous flyback converter (and therefore at the power switch) at the end of each flyback cycle, resulting in the need to drop additional voltage in order to bring the voltage across the power switch to zero.

The present invention also recognizes that continuous flyback power converters with zero voltage switching circuits can be combined in an interleaved manner. Doing so reduces disadvantages associated with ripple current in the primary and secondary circuits of the power converters and further improves the efficiency and power density of the converters.

Referring now to FIG. 1, a flyback power converter for use in an interleaved flyback power converter system according to the present invention is shown at 100. Power converter 100 receives an input voltage ($V_{IN}$) at an input port 101 and converts it to an output voltage ($V_{OUT}$) at output port 102, which is preferably coupled to a load 103. Power converter 100 comprises a transformer 130 having a primary winding 132, a secondary winding 134, and a leakage inductance, which is modeled in FIG. 1 by an inductor 136 coupled in series with primary winding 132 and shown in phantom. One end of primary winding 132 is coupled to input port 101 and an input filtering capacitor 104. A power switch 110, preferably a FET 111 (which, as is well known, has a body diode 112 and stray capacitance 113 coupled between its drain and its source), is coupled between the other end of the primary winding and ground. One end of secondary winding 134 is coupled through a rectifier 140 to a terminal of output port 102 and the other end of secondary winding 134 is coupled to the other terminal of output port 102. A capacitor 142 is coupled between the terminals of output port 102.

During operation, power switch 110 is repeatedly switched on and off, alternately coupling input voltage $V_{IN}$ across primary winding 132. When power switch 110 closes for an ON period (i.e., the drive cycle), input voltage $V_{IN}$ is coupled across primary winding 132, causing current $I_M$ to flow through winding 132 and magnetic energy to be stored in transformer 130. During the ON period, rectifier 140 blocks current from flowing through secondary winding 134. When power switch 110 opens at the beginning of a subsequent OFF period (i.e., the flyback cycle), the stored energy in transformer 130 is coupled from secondary winding 134 to output port 102 by means of a secondary current $I_S$ conducted through rectifier 140 to output port 102. This energy is stored on capacitor 142, which generates an output voltage $V_{OUT}$. $V_{OUT}$ is coupled to load 103 via output port 102.

When power switch 110 is closed during an ON period, a current is also generated through leakage inductance 136 and energy is stored therein. At the beginning of each OFF period in a conventional flyback power converter, the current in inductance 136 would continue to flow, flowing into the stray capacitance 113 of FET 111 and raising the drain voltage $V_D$ of FET 111. As is well known, a high-frequency resonant circuit would be formed by leakage inductance 136 and capacitance 113 in many prior art flyback converters, causing "ringing" at the beginning of each OFF period as energy is transferred between capacitance 113 and inductance 136, and causing a leakage inductance voltage spike to be generated across secondary winding 134. In prior art flyback converters, this resonant circuit is conventionally damped by a conventional "snubber" circuit, which dissipates the energy of this resonant circuit, and the leakage inductance voltage spike is dampened by an inductor or "choke" coupled in series with the secondary winding. Unfortunately, the values of leakage inductance 136 for flyback converters is relatively large in comparison to the magnetizing inductances of such transformers, and a relatively large amount of energy is wasted in such snubber circuits. Moreover, prior art secondary-side chokes are undesirably bulky.

In power converter 100 according to the present invention, the energy in leakage inductance 136 is captured and returned to the input power source at input port 101 by an active clamp circuit, thereby recycling the energy and also eliminating the leakage inductance voltage spike. The active clamp circuit comprises a series combination of an auxiliary switch 120, preferably a FET 121 (shown with body diode 122 and stray capacitance 123 coupled between its drain and its source), and a storage capacitor 125. This series combination is preferably coupled, as shown in FIG. 1, between the switched terminal of primary winding 132 (i.e., the terminal of winding 132 which is coupled to the drain terminal of power switch 110) and input port 101. Auxiliary switch 120 operates substantially in anti-phase relation to power switch 110. The operation of switches 110 and 120 is non-overlapping, with auxiliary switch 120 closing after power switch 110 opens and opening before power switch 110 next closes. Body diode 122 is oriented to enable current to flow from leakage inductance 136 to capacitor 125. When auxiliary switch 120 is closed, capacitor 125 applies a reversing voltage to the series combination of the primary winding 132 and leakage inductance 136. This reversing voltage has a polarity which is opposite to that of the voltage applied to the series combination during the preceding ON period.

During the initial portion of the flyback cycle, therefore, the energy stored in primary winding 132 and leakage inductance 136 during the drive cycle is released, generating an auxiliary current $I_A$ that flows into capacitor 125, increasing the charge stored thereon. However, because of the opposite polarity of the reversing voltage, the magnitude of the current through inductance 136 and winding 132 decreases toward zero amperes. Once reaching zero amperes, the reversing voltage of capacitor 125 causes current $I_A$ to become negative, that is to flow in the opposite direction and flow through the series combination of inductance 136 and winding 132, thus returning the energy captured by capacitor 125 to capacitor 104. The energy stored in leakage inductance 136 is thus returned to the input power source, rather than being dissipated as waste energy by a snubber circuit. Since this energy is not dissipated, the conversion efficiency of power converter 100 is improved over that of a conventional flyback converter. Capacitor 125 preferably has a large capacitance, so that the reversing voltage is maintained at a relatively constant value during the OFF period. As is known in the active clamp art, capacitor 125 naturally reaches, by transient charging, a well-defined voltage for each set of steady-state operating conditions.

In addition to recycling the energy stored in leakage inductance 136, the above-described active clamp circuit allows for zero voltage switching of power switch 110. As described above, auxiliary switch 120 is turned on during the flyback cycle, allowing a reverse current to be conducted from capacitor 125 through leakage inductance 136 and primary winding 132. This reverse current slowly lowers the voltage of capacitor 125 and capacitance 113, which is relatively small in comparison to the capacitance of capacitor 125. To provide zero voltage switching, auxiliary switch 120 is turned off for a period of time before power switch 110 is again turned on. When power switch 120 is turned off, the reverse current through leakage inductance 136 and primary winding 132 continues to flow. Since capacitance 113 is relatively small in comparison to capacitor 125, the reverse current quickly lowers the voltage stored on capacitance 113, reducing drain voltage $V_D$ to zero before power switch 110 is turned on.

In addition to recycling the energy stored in the leakage inductance and providing zero voltage switching for a continuous flyback power converter, the present invention shapes the output voltage waveform to eliminate undesirable harmonic content, thereby eliminating the need for a secondary-side choke, and allows for zero voltage turn-on of rectifier 140, thereby reducing power losses in this rectifier. In prior art flyback circuits without a secondary-side choke, at the beginning of each flyback cycle, the voltage across secondary winding 134 would quickly rise to a high value and the secondary current would quickly begin to flow with a high initial value, thereafter ramping down to a lower value.

In power converter 100, at the beginning of the flyback cycle, the energy stored in the transformer core and the leakage inductance will initially be released from the primary winding 132 and directed to capacitor 125, with no current initially flowing through secondary winding 134. The voltage across secondary winding 134 will rise as current through primary winding 132 decreases, thereby forwarding biasing rectifier 140 before substantial current is flowing in the secondary circuit, and further thereby reducing turn-on losses in rectifier 140. In other words, the primary current is not immediately cut off at the beginning of each flyback cycle as in many prior art circuits. The voltage across secondary winding 134 will not immediately jump as high as in prior art circuits, and instead will rise more slowly with correspondingly reduced harmonic content in the output voltage waveform. For these reasons and because the leakage inductance voltage spike is eliminated, no secondary choke is necessary.

Power converter 100 includes a control means 150 that controls the conduction state of FETs 111 and 121 to provide the desired non-overlapping, anti-phase switching relationship described above and discussed further below in connection with FIG. 2. To do so, control means 150 generates appropriately timed voltage pulses in the power switch drive voltage $V_P$ between the gate and source of FET 111 and in the auxiliary switch drive voltage $V_A$ between the gate and source of FET 121. Various ways of generating these control signals to FETs 111 and 121 will be apparent to those skilled in the art based on the present disclosure and an explanation thereof is not necessary to enable one of ordinary skill in the art to make and use the present invention. An isolation transformer 152 is coupled between control means 150 and FET 121 so that isolation is maintained between power switch 110, having its source grounded, and auxiliary switch 120, having its source voltage varying with drain voltage $V_D$.

Referring now to FIG. 2, the operation of electrical power converter 100 will be further described. FIG. 2 shows a timing diagram 200 illustrating selected voltages and currents during several switching cycles of operation of power converter 100.

Timing diagram 200 comprises six interrelated timing diagrams 201-206, each depicting a voltage or current level within power converter 100 as a function of time. Time lines $t_0$ through $t_5$ cut vertically through diagrams 201-206 at selected time points, thereby correlating the values of each illustrated voltage or current level at that point in time.

The gate drive voltages $V_P$ and $V_A$ to FETs 111 and 121, respectively, are shown in diagrams 201 and 202, respectively. The high voltage levels shown in diagrams 201 and 202 are conventional gate voltage levels sufficient to turn on their respective FETs, and the illustrated low voltage levels correspond to a non-conducting state of the respective FETs. High and low voltage levels of voltage $V_P$ illustrate the drive cycles and flyback cycles, respectively, of power converter 100. As illustrated, drive cycles begin at times $t_1$ and $t_5$ and flyback cycles occur prior to $t_1$ and between $t_2$ and $t_5$. As explained above, FET 121 is turned on during flyback cycles (at time $t_3$) and is turned off during flyback cycles (at times $t_0$ and $t_4$). After a delay period $t_D$ from the times at which FET 121 is turned off, FET 111 is turned on (at times $t_1$ and $t_5$).

The drain voltage $V_D$ of FET 111 (at the node where switches 110 and 120 are coupled to primary winding 132) is shown in diagram 203. After power switch 110 is turned off, between times $t_2$ and $t_3$, voltage $V_D$ rises to a value much higher than the input voltage $V_{IN}$ due to the inductance in the primary winding. As apparent from the timing diagram, voltage $V_D$ does not immediately rise to its highest value and there is no leakage inductance voltage spike, for the reasons explained above, due to the primary current being redirected to capacitor 125. As the primary current decreases and then reverses, however, voltage $V_D$ peaks and begins to fall, as shown between times $t_3$ and $t_4$ in timing diagram 203. At time $t_4$, auxiliary switch 120 is turned off, and the reverse current through primary winding 132 rapidly reducing the voltage across stray capacitance 113, causing voltage $V_D$ to fall quickly to zero, as shown between times $t_4$ and $t_5$ in diagram 203. Thus, voltage $V_D$ is substantially equal to zero volts when power switch 110 turns on again at time $t_5$, thus implementing zero voltage switching.

The current $I_M$ through power switch 110, from primary winding 132 to ground, is shown in diagram 204. At the beginning of each drive cycle, current $I_M$ jumps quickly to a positive value. This is due to the magnetizing energy remaining in the transformer at the end of the flyback cycle, since power converter 100 is operating in continuous mode.

(It will be recognized by those skilled in the art that, in discontinuous converters, the primary current would have ramped up linearly from substantially zero amps.) After reaching an initial positive value, according to the present invention, current $I_M$ ramps up relatively linearly for the remainder of the drive cycle. At the beginning of the flyback cycle, current $I_M$ falls to zero because power switch 110 is turned off and primary current is redirected to capacitor 125. At the end of the flyback cycle, after auxiliary switch 120 is turned off, the reverse current through primary winding 132 pulls current in the reverse direction through capacitor 113 as voltage $V_D$ is drawn to zero, as shown by current $I_M$ reaching a negative value during delay periods $t_D$.

The current $I_A$ through auxiliary switch 120, from primary winding 132 to capacitor 125, is shown in diagram 205. As shown at time $t_2$, at the beginning of each flyback cycle, current $I_A$ jumps quickly to the value that current $I_M$ had at the end of the drive cycle, because the current through power switch 110 is redirected to capacitor 125 through auxiliary switch 120. This redirected current initially flows through body diode 122, transferring both energy from the leakage inductance 136 and magnetizing energy from the core of transformer 130 to capacitor 125, causing the voltage stored thereon to rise. Because the primary current is redirected to capacitor 125, there is no need for a snubber circuit to dissipate the leakage inductance energy, and there is no voltage spike produced by the leakage inductance in the secondary circuit. While current is flowing to capacitor 125, auxiliary switch 120 turns on, enabling current $I_A$ to flow through FET 121 to capacitor 125 and, when appropriate, to reverse. As shown between times $t_2$ and $t_4$, current $I_A$ decreases and then reverses when the leakage inductance energy has been transferred to capacitor 125 and the secondary current $I_S$ has reached a high enough value so that it is releasing the magnetizing energy from transformer 130 at a relatively high rate. The reverse current $I_A$ therefore returns energy from capacitor 125 to capacitor 104 via primary winding 132, thereby recycling the energy that had been stored in the leakage inductance. The precise time when auxiliary switch 120 turns on is not critical to the present invention (it may, for example, turn on as soon as power switch 110 is turned off), but it should turn on before the time at which $I_A$ would tend to reverse based on the resonant characteristics of the clamp circuit. When auxiliary switch 120 is turned off, current $I_A$ falls to a value close to zero, as shown at time $t_4$. After auxiliary switch 120 is turned off, the reverse current $I_A$ may continue to flow through stray capacitance 123 of FET 121 at a very low value, but current $I_A$ does not begin flowing again in any substantial value until the end of the next drive cycle.

The current $I_S$ flowing out of secondary winding 134 is shown in diagram 206. As illustrated and explained above, current $I_S$ is equal to zero amps during each drive cycle. At the beginning of each flyback cycle, current $I_S$ remains at about zero amps because the energy stored in the transformer is directed to capacitor 125. This allows rectifier 140 to become forward biased before substantial current is directed through it, thereby minimizing forward recovery losses and reducing high frequency noise generation. As the primary current decreases, however, current $I_S$ rises at an increasing rate until all magnetizing energy from the transformer is being released through secondary winding 134. As the magnetizing energy is released, the value of current $I_S$ begins to fall. The reverse current through primary winding 132 induces additional current in secondary winding 134, slowing the rate of decrease of current $I_S$. Thus, the value of capacitor 125, which affects the maximum reverse current that flows through the primary winding, causes the secondary current $I_S$ to flow for a longer period of time and ensures that there is time for zero voltage switching at high frequencies where the leakage inductance is low. As explained above, before all magnetizing energy has been released through secondary winding 134 (that is, the magnetizing current continues to flow in the same direction as during the drive cycle and magnetic flux is oriented in the same direction as during the drive cycle), power switch 110 is turned on and current $I_S$ ceases to flow. As illustrated, current $I_S$ resembles a half sinusoidal waveform and has a relatively low high frequency harmonic content, as compared to the trapezoidal output current waveforms common in prior art flyback converters operated in continuous mode. This reduces power losses.

The present invention also reduces reverse recovery power losses in rectifier 140, as compared to reverse recovery losses in the secondary-side rectifier of conventional, continuous flyback converters. Reverse recovery losses are reduced in the present invention because the conditions in the primary circuit at the beginning of each drive cycle are different than in prior art flyback converters and cause a lower rate of change in the voltage across and current through rectifier 140 at the beginning of each drive cycle. Specifically, as described above, the voltage at the drain of switch 110 has dropped to zero and a reverse current is conducted through the primary winding at the end of the flyback cycle, immediately prior to each drive cycle. These conditions reduce the rate of change in the voltage across rectifier 140 and the current through rectifier 140 during the reverse recovery period of rectifier 140 at the beginning of each drive cycle. This also results in a reduced level of EMI at the beginning of each drive cycle. In prior art continuous flyback converters, the primary power FET is "hard switched" into a conducting state, and this results in well known high rates of change in the current and voltage seen by the secondary side rectifier, and high EMI.

In prior art continuous flyback power converters, when the primary power FET is turned on at the beginning of each drive cycle, the current through the primary winding immediately jumps from zero to a finite value that depends on the magnetizing current in the transformer at that time, and the secondary current immediately drops to zero (a high rate of change that increases reverse recovery losses). As shown in diagram 204, according to the present invention, the current through the primary winding at the beginning of each drive cycle will ramp up more slowly than in prior art continuous flyback power converters. Correspondingly, the current through the secondary winding decreases at a slower rate (in fact, dropping to zero in about 80 nanoseconds) than in prior art continuous flyback converters. The delay in the rise of the primary current allows time for switch 110 to turn on under zero voltage switching conditions. The delay in the decrease of the secondary current helps to reduce reverse recovery losses in rectifier 140, as explained above.

Power converter 110 is preferably operated at a frequency of 250 kHz to 500 kHz. However, the power converter 110 is not limited to operating within the above range as it can also properly function at frequencies above 500 kHz. Thus, the power converter can operate at frequencies up to and including 2 MHz without excessive power dissipation. At frequencies up to about 250 kHz, a small amorphous saturating bead may be placed between secondary winding 134 and rectifier 140 to help reduce reverse and forward recovery losses in rectifier 140, in a conventional manner, by helping to limit the rate of change in current through the rectifier when it is switched between a forward and reverse biased state.

When power converter 110 is part of a two converter interleaved system, then the preferred operating frequency for power converter 110 is 125 kHz and above. When each of the converters in an interleaved structure operates at 125 kHz, then the operating frequency for the overall system will be 250 kHz since the frequency of the interleaved output of the two converters is twice as large as the frequency of the output of each individual converter. Therefore, the interleaved power system can operate at a frequency of up to and including 4 MHz.

As explained above, the drain voltage of FET 111 is brought to zero, in order for zero voltage switching to occur, by generating a reverse current $I_A$ from capacitor 125 through leakage inductance 136 to winding 132 and opening switch 120 prior to the beginning of the drive cycle. The reverse current through the leakage inductance then pulls the drain voltage $V_D$ to zero. It will be appreciated that higher $V_D$ requires higher peak reverse current $I_A$ and/or higher leakage inductance 136. In fact, the drain voltage that can be reduced to zero by the active clamp system is substantially proportional the square root of formula (1), below:

$$L_{leakage} * I_{A,peak}^2 / K \qquad (1)$$

where $L_{leakage}$ is the value of inductor 136 and $I_{A,peak}$ is the current through switch 120 in the direction toward inductor 136 when switch 120 is turned off. K is given by formula (2), below:

$$K = V_{C113} + V_{C125} + V_{Ctrans} + (V_{Crect}/(turns\ ratio)^2) \qquad (2)$$

where $V_{C113}$ is the voltage stored on capacitor 113, $V_{C125}$ is the voltage stored on capacitor 123, $V_{Ctrans}$ is the voltage stored on the inherent transformer capacitance across primary winding 132, and $V_{Crect}$ is the voltage stored on the stray capacitance of rectifier 140.

As the formulas given above indicate, the amount of voltage that can be eliminated from the drain of FET 111 to allow for zero voltage switching is functionally related to the values of the primary leakage inductance and the peak reverse current through FET 121 and inductor 136 when FET 121 is turned off. If the leakage inductance is smaller, less time is available to drop the drain voltage to zero and a higher reverse current through FET 121 and inductor 136 will be necessary in order to reduce a given voltage at the drain of FET 111 to zero. It will be appreciated by those skilled in the art, based on the present disclosure, that the amount of reverse current $I_A$ can be tuned to accommodate the value of the leakage inductance and the drain voltage that must be dropped to provide zero voltage switching, and that this is accomplished by adjusting the value of capacitor 125 as necessary. A smaller leakage inductance allows for zero voltage switching at higher frequencies because a shorter period is used to reduce the voltage to zero.

In a preferred embodiment, multiple series-transformers are used in place of transformer 130 of FIG. 1. The effective size of the magnetic transformer system is increased by using multiple series transformers without the need for a single, high volume component that would dictate the size and shape of the entire power converter. The use of multiple transformers, rather than a single large transformer, allows the power converter to fit in low profile packages because the thickness of the cores of each transformer does not need to be as thick as if a single transformer were used. Multiple transformers also result in lower overall leakage inductances and permits higher frequency operation. In addition, multiple small transformers decrease the total amount of magnetic losses in the transformer cores, as compared to a single large transformer.

An embodiment of a power converter having multiple series transformers according to the present invention is shown at 300 in FIG. 3. Many of the components are the same as described in connection with FIG. 1 and have numbering identical to the numbering in FIG. 1. The basic operation of power converter 300 is consistent with the description given in connection with FIG. 2, with the additional advantages described above.

Power converter 300 preferably includes three series-connected transformers 320, 340 and 360. Transformers 320, 340 and 360 include primary windings 322, 342, and 362, respectively, and secondary windings 324, 344, and 364, respectively. As is well known, transformers 320, 340, and 360 each have an inherent capacitance between their primary and secondary windings (modeled by capacitors 326, 346, and 366, respectively), between each end of their respective primary windings (modelled by capacitors 328, 348, and 368, respectively), and between each end of their respective secondary windings (modelled by capacitors 330, 350, and 370, respectively). As is also known, each transformer will have inherent resistive losses in each winding, which are modelled by resistors 332, 334, 352, 354, 372, and 374 each shown in series with a transformer winding. Finally, as is also known, each transformer will have inherent leakage inductances in each winding, which are modelled by inductors 336, 338, 356, 358, 376, and 378 each shown in series with a transformer winding.

One end of primary winding 322 is coupled to $V_{IN}$. The other end of primary winding 322 is coupled to an end of primary winding 342 at node 380. The other end of primary winding 342 is coupled to one end of primary winding 362 at node 382. The other end of primary winding 362 is coupled to power switch 110 at the drain of FET 111. Nodes 380 and 382 are the buss bar primary connections.

One end of secondary winding 324 is coupled to rectifier 140 and the other end of secondary winding 324 is coupled to secondary winding 344 at node 384. The other end of secondary winding 344 is coupled to an end of secondary winding 364 at node 386. The other end of secondary winding 364 is coupled to a terminal of output port 102. Nodes 384 and 386 are the bus bar secondary connections.

As noted above, the sum of primary leakage inductances 336, 356, and 376 will be less than the leakage inductance of a large single transformer with equivalent effective magnetic area. In addition, the series primary and secondary of the transformers operates in part as a lossless delay line to help provide some zero voltage switching capability.

Details of preferred (not required) component types/values for elements of power converter 100 are provided below.

| | |
|---|---|
| $V_{IN}$ | 180–400 V |
| $V_{OUT}$ | 1–48 V |
| Number of Turns on the Primary Winding | 5–18 |
| Number of Turns on the Secondary Winding | 1–6 |
| Transformer 130 | Magnetics DR43622 Core 16Tpri, 2Tsec |
| FET 111 | APT6030BN or APT8075BN |
| FET 121 | APT601R3 or IRFBC40 |
| Capacitor 125 | 0.06 microF, 500 V, ceramic |
| Rectifier 140 | XGR818 Gallium Arsenide (2 in parallel) or MUR1620 or MURH840 (2 in parallel) |
| Capacitor 104 | 0.47 microF, 400V, polyester, multilayer plastic |
| Capacitor 142 | 12 microF, 100 V, multilayer plastic (preferably comprising 3 capacitors of 4 microF each) |

-continued

| | |
|---|---|
| Inductance 136 | 4.67 microH |
| Power Level of Converter | 200 Watts or less |
| Switching Frequency | 125 kHz to 2 MHz |

Details of preferred component types/values for elements of power converter 300 not already given above are shown below.

| | |
|---|---|
| Number of Turns on the Primary Winding (each transformer) | 5–18 |
| Number of Turns on the Secondary Winding (each transformer) | 1–6 |
| Preferred Turns Ratio (each transformer) | 6:2 |
| Resistors 332, 352, 372 | 0.6 Ohm |
| Resistors 334, 354, 374 | 10 mOhm |
| Inductors 336, 356, 376 (0.6 microH = series sum of 336 + (338/turns ratio), etc . . . ) | 0.6 microH |
| Inductors 338, 358, 378 | 67 nanoH |
| Windings 322, 342, 362 | 20–21 microH |
| Windings 324, 344, 364 | 2.24–2.29 microH |
| Capacitors 328, 348, 368 | approx. 5 picoF |
| Capacitors 330, 350, 370 | approx. 10 picoF |
| Capacitors 326, 346, 366 | approx. 12 picoF |

Continuous flyback converters according to the present invention perform with exceptionally high efficiency over wide ranges of load currents and input voltages. In fact, the efficiency of converters according to the present invention remain in the range of 80% to 95% over an input voltage in at least the range of 180 V to 400 V and a load current in at least the range of 2 amps to 11 amps.

An interleaved flyback electrical power converter system according to the present invention is shown at 400 in FIG. 4.

Interleaved flyback electrical power converter system 400 includes two flyback electrical power converters 420 and 440. Power converters 420 and 440 each operate in continuous mode and have power switches 422 and 442, respectively, operated under zero voltage switching conditions under the control of control means 408. Power converters 420 and 440 are coupled in parallel and power switches 422 and 442 are switched between ON and OFF states 180 degrees out of phase with one another by said control means 408. Each of the power converters 420 and 440 is equivalent to the power converter shown in FIG. 1. Therefore, a more detailed view of the components of power converters 420 and 440 can be seen by looking at the equivalent components in FIG. 1.

Power converters 420 and 440 receive an input voltage ($V_{IN}$) stored on an input capacitor 402 at input ports 424 and 444, respectively. Power converters 420 and 440 convert the input voltage $V_{IN}$ to an output voltage ($V_{OUT}$) stored on an output capacitor 404, which is preferably coupled to a load 406.

In addition to power switch 422, power converter 420 comprises a transformer 426 having a primary winding 428, a secondary winding 430, and a leakage inductance, which is modelled in FIG. 4 by an inductor 432 coupled in series with primary winding 428 and shown in phantom. One end of primary winding 428 is coupled to input port 424. Power switch 422 is coupled between the other end of primary winding 428 and ground. One end of secondary winding 430 is coupled through a rectifier 434 to a terminal of output port 436 and the other end of secondary winding 430 is coupled to the other terminal of output port 436. The terminals of output port 436 are coupled to opposite sides of output capacitor 404. Power converter 420 further includes a clamp switch 438 and a clamp capacitor 439 coupled in series between power switch 422 and input port 424. Power converter 420 is operated as a continuous flyback power converter with zero voltage switching as explained above in connection with FIGS. 1–3.

In addition to power switch 442, power converter 440 comprises a transformer 446 having a primary winding 448, a secondary winding 450, and a leakage inductance, which is modeled in FIG. 4 by an inductor 452 coupled in series with primary winding 448 and shown in phantom. One end of primary winding 448 is coupled to input port 444. Power switch 442 is coupled between the other end of primary winding 448 and ground. One end of secondary winding 450 is coupled through a rectifier 454 to a terminal of output port 456 and the other end of secondary winding 450 is coupled to the other terminal of output port 456. The terminals of output port 456 are coupled to opposite sides of output capacitor 404. Power converter 440 further includes a clamp switch 458 and a clamp capacitor 459 coupled in series between power switch 442 and input port 444. Power converter 440 is operated as a continuous flyback power converter with zero voltage switching as explained above in connection with FIGS. 1–3.

Switches 422, 438, 442 and 458 are controlled by control means 408, such that power converters 420 and 440 each operate in continuous mode and such that power switches 422 and 442, respectively, are operated under zero voltage switching conditions. Control means 408 also controls switches 422 and 442 such that they are switched between ON and OFF states 180 degrees out of phase with one another.

Although output ports 436 and 456 are shown as being separate output ports, they in fact function as simply one output port when coupled together. Thus, as shown in FIG. 4, the coupling of output ports 436 and 456 at terminals 476 across capacitor 404 effectively merges the output ports 436 and 456 into one output port 476, which is also referred to above as terminals 476.

The system shown in FIG. 4 may be generalized to include N flyback power converters operated in continuous mode, where N is an integer greater than two. The N power converters would be coupled to an output load and each of the N power converters would be operated at 360/N degrees out of phase with one of the other power converters in the system.

As can be clearly seen in FIG. 4, each clamp switch is associated with only one power switch. Moreover, each clamp capacitor is associated with only the active clamp switch to which it is coupled. Therefore, there is one clamp switch and one clamp capacitor exclusively devoted to only one power switch. Those skilled in the art would appreciate that the use of a separate clamp switch and a separate clamp capacitor in conjunction with each of the power switches, among other benefits, allows for zero voltage switching of the power switches in the system. It also allows for operating the power switches at 10 to 85% duty ratio without causing cross conduction problems (i.e., simultaneous conduction by a power switch and its corresponding clamp switch). Moreover, it allows for the use of independent clamp cycles for each of the two power converters in the system and the sinusoidal shaping of the secondary currents from both of the converters when operating below 50% duty ratio.

It will also be appreciated by those of ordinary skill in the art that the use of only one clamp capacitor in conjunction with two clamp switches, as taught by the prior art, in addition to causing cross conduction problems would also preclude the use of independent clamp cycles for each of the two power converters when operated below 50% duty ratio, which precludes the sinusoidal shaping of the secondary current from at least one of the power converters. In fact, in such prior art systems, the output current waveform would not be symmetric at all and the resultant power supply output noise would be greater than in a system, such as that of the present invention, with a symmetric current output.

It will also be appreciated by those of ordinary skill in the art that the above problems are at least as severe in the case of interleaved power converter systems using only one clamp switch and one clamp capacitor in conjunction with two power switches. Therefore, the present invention provides substantial advantages over systems which only use one clamp switch in conjunction with more than one power switch. It also provides substantial benefits over power systems which use only one clamp capacitor in conjunction with more than one clamp switch and consequently more than one power switch.

Timing diagrams showing the individual and combined output current waveforms of power converters 420 and 440 during the same time period are shown in FIG. 5. FIG. 5 illustrates the manner in which an interleaved continuous flyback power converter system, operated under zero voltage switching conditions, reduces the secondary ripple current levels and reduces stress on the output capacitor.

Timing diagram 501 shows the output current $I_{420}$ of power converter 420. The waveform of output current $I_{420}$ corresponds to the waveform of current $I_S$, which was described in connection with timing diagram 206 of FIG. 2. The dashed line 504 shown in diagram 501 illustrates the average output current that would be provided to the load by power converter 420, assuming that power converter 420 were operated independently and power converter 440 did not exist.

The zero power contribution period is defined as the period in which current $I_{420}$ is lower than the average output current shown by dashed line 504. During this period, the output voltage will tend to decrease as the load draws more current than the power converter is providing. The voltage will tend to rise during periods when current is provided to the output capacitor in excess of the amount of current required by the load. This repeated overcharging and undercharging of the output capacitor places high amounts of stress on the capacitor and creates an output ripple voltage.

Timing diagram 502 shows the output current $I_{440}$ of power converter 440. Output current $I_{440}$ also has a waveform corresponding to current $I_S$ described in connection with timing diagram 206 of FIG. 2. The waveforms of output currents $I_{420}$ and $I_{440}$ are, however, 180 degrees out of phase with each other, because the power switches of power converters 420 and 440 are operated 180 degrees out of phase with each other.

In the example illustrated in FIG. 5, power converters 420 and 440 are each operating at 50% duty ratio, which is herein defined as the ratio of the ON period of a power switch divided by the sum of the ON and OFF periods of the same power switch. In another embodiment, one power converter may operate at less than 50% duty ratio while the other power converter operates at more than 50% duty ratio. In yet other embodiments, both power converters 420 and 440 may operate at either less than 50% duty ratio or greater than 50% duty ratio. Therefore, the power converters of the present invention are not limited to operating at 50% duty ratio. The power converters 420 and 440 may be operated at less than 50% duty cycle because the system disclosed in FIG. 4 includes a separate clamp switch and clamp capacitor for each power converter, which enables operating at less than 50% duty ratio without causing cross conduction between the clamp switches and the power switches, i.e. simultaneous conduction by a power switch and its corresponding clamp switch.

The dashed line 505 shown in diagram 502 illustrates the average output current that would be provided to the load by power converter 440, assuming that power converter 440 were operated independently and power converter 420 did not exist. The zero power contribution period is when output current $I_{440}$ is lower than the average output current shown by dashed line 505.

The combined output current $I_{comb}$ provided to capacitor 404 from both power converter 420 and power converter 440 is shown in timing diagram 503. The average output current provided by output capacitor 404 to the load is shown as dashed line 506.

As shown in timing diagrams 501–503, the ripple frequency at the output capacitor doubles when two power converters are interleaved, and the zero power contribution period is dramatically reduced. This is illustrated by the reduced time period that the combined current $I_{comb}$ is substantially equal to zero. This significantly reduces the stress on the output capacitor, and also reduces the output ripple voltage.

The effect of the increased ripple current frequency, given the half-sinusoidal current, waveform of the secondary currents is to reduce the RMS value of the ripple current in comparison to conventional flyback power converters, either standing alone or interleaved. This results in reduced power losses, less output noise, and reduced need for inductive filtering. Eliminating the need for inductive filtering, in turn, allows for higher power density.

As can be clearly seen in FIG. 5, the output current contributed by each of the power converters is symmetric and has a half-sinusoidal waveform. Moreover, each of the power converters contributes an equal amount of current to the secondary circuit. Therefore, the charge contributions by each of the two power converters to the secondary current are equal.

It will be appreciated by those skilled in the art that the present invention may be implemented with separate input voltages and input capacitors for each interleaved power converter.

It will further be appreciated that the present invention may be implemented with separate output capacitors for each power converter, where the output capacitors of each power converter provide output current to a single load.

The present invention has been described in connection with what is presently considered to be its most practical and preferred embodiments. It will be understood that the present invention is not limited to the described embodiments. Rather, the present invention encompasses all modifications and equivalents of the described embodiments that are included within the scope of the appended claims.

What is claimed is:

1. An interleaved continuous flyback power converter system for providing power to a load, said system comprising:

an output port for coupling said system to said load; and
   first and second flyback power converters, wherein said converters are coupled in parallel to said output port and operate in continuous mode, and further wherein each said power converter comprises:
   an input port for receiving an input voltage;
   a transformer having a primary winding and a secondary winding, wherein a first terminal of said primary winding is coupled to a first terminal of said input port and further wherein a second terminal of said secondary winding is coupled to a second terminal of said output port;
   a power switch, said power switch having first and second conduction terminals, wherein voltage across said first and second conduction terminals defines a switch voltage, and further wherein said first conduction terminal of said power switch is coupled to a second terminal of said primary winding and said second conduction terminal of said power switch is coupled to a second terminal of said input port, said power switch being switched to alternating ON and OFF states, wherein power is coupled from said input port to said primary winding during said ON states and wherein substantially no power is coupled from said input port to said primary winding during said OFF states, said transformer storing energy during said ON states and releasing energy to the output port during said OFF states, further wherein said switch voltage is substantially zero volts when said power switch is switched to said ON state from said OFF state;
   a series combination of a clamp capacitor and a clamp switch, said series combination having one terminal coupled to the first terminal of said input port and the first terminal of said primary winding, said series combination having a second terminal coupled to said second terminal of said primary winding, said clamp switch having an auxiliary ON state and an auxiliary OFF state; and
   a rectifier, wherein a first terminal of said rectifier is coupled to a first terminal of said secondary winding and a second terminal of said rectifier is coupled to a first terminal of said output port such that current is substantially blocked from flowing from said output port to said secondary winding during said ON states of the power switch and is enabled to flow to said output port during said OFF states;

said system further comprising:
   an output capacitor coupled to said output port; and
   control means coupled to each of said clamp switches and each of said power switches for switching said power and clamp switches between said ON and OFF states and said auxiliary ON and OFF states, respectively.

2. The flyback power converter system of claim 1, wherein said power switch is switched between successive ON and OFF states at a frequency of at least 125 kHz.

3. The flyback power converter system of claim 2, wherein each of said power switches operates at a duty ratio of 50%.

4. The flyback power converter system of claim 2, wherein each of said power switches operates at a duty ratio greater than 50%.

5. The flyback power converter system of claim 2, wherein each of said power switches operates at a duty ratio less than 50%.

6. The flyback power converter system of claim 2, wherein each power converter provides an output current, having a current ripple, to said output port, and further wherein the current outputs of said power converters are interleaved such that overall current ripple of the system is lower than current ripple separately generated by each said converter.

7. The flyback power converter system of claim 2, wherein there are less than 8 turns in the primary winding and less than 3 turns in the secondary winding.

8. The flyback power converter system of claim 1, wherein said rectifier is forward biased during said OFF state to enable a secondary current to be conducted in said secondary winding during said OFF state and reverse biased during said ON state to prevent said secondary current from being conducted during said ON state.

9. The flyback power converter system of claim 8, wherein each said power converter further comprises:
    a current path enabling electrical current to be conducted through said current path from said first conduction terminal to said clamp capacitor during said OFF state;
    wherein electrical current is enabled to be conducted from said clamp capacitor to said first conduction terminal during said auxiliary ON state and wherein electrical current is not enabled to be conducted from said clamp capacitor to said first conduction terminal during said auxiliary OFF state;
    further wherein said clamp switch is switched to said auxiliary ON state while said power switch is in said OFF state, enabling a reverse current to be conducted from said clamp capacitor through said first conduction terminal and said primary winding, and wherein said clamp switch is switched to said auxiliary OFF state a selected period of time before said power switch is switched to said ON state such that said reverse current conducted through said primary winding lowers said switch voltage to approximately zero volts before said power switch is switched to said ON state.

10. The flyback power converter system of claim 9, wherein said secondary current increases in value at the beginning of the OFF state of the power switch and decreases in value prior to the end of the auxiliary ON state of said clamp switch.

11. The flyback power converter system of claim 10, wherein said clamp switch of each said power converter is a FET and said current path comprises a body diode of said FET.

12. The flyback power converter system of claim 11, wherein each said transformer further comprises a primary leakage inductance, and further wherein said clamp capacitor, said clamp switch and said primary leakage inductance in each said converter generate said reverse current in said primary leakage inductance during the OFF state of the corresponding power switch, said reverse current lowering the voltage across said power switch in said selected time period prior to said power switch being switched to its ON state.

13. The flyback power converter system of claim 8, wherein said secondary current is substantially equal to zero amps when said rectifier becomes forward biased during said OFF state.

14. The flyback power converter system of claim 8, further comprising means for reducing reverse recovery losses in said rectifier when said rectifier becomes reverse biased.

15. The flyback power converter system of claim 8, wherein said secondary current increases in value at the beginning of the OFF state of each of said power switches and decreases in value prior to the end of each said OFF state.

16. The flyback power converter system of claim 15, wherein said secondary current contributed by each power converter has a substantially half-sinusoidal waveform during the OFF period of said power converter such that said secondary current comprises a plurality of substantially half-sinusoidal waveforms.

17. The flyback power converter system of claim 16, wherein charge contributed to said output current by said first power converter is substantially equal to charge contributed to said output current by said second power converter.

18. The flyback power converter system of claim 1, wherein there are less than 17 turns in the primary winding and less than 6 turns in the secondary winding.

19. The flyback power converter system of claim 1, wherein said system produces an output voltage at said output port of not more than 48 volts.

20. The flyback power converter system of claim 19, wherein said system produces an output voltage at said output port of not more than 24 volts.

21. The flyback power converter system of claim 20, wherein said system produces an output voltage of not more than 5 volts and an output power greater than 100 watts.

22. The flyback power converter system of claim 1, wherein said output capacitor is a multilayer plastic capacitor.

23. The flyback power converter system of claim 1, wherein said output voltage waveform does not include undesirable harmonic content thereby eliminating the need for a secondary side choke.

24. The flyback power converter system of claim 1 having a reduced level of Electromagnetic Interference (EMI) in the secondary circuit.

25. The flyback power converter system of claim 24, wherein EMI is reduced when the power switch is turned ON.

26. The flyback power converter system of claim 1, wherein said transformer of each said power converter comprises a plurality of series-connected transformers.

27. The flyback power converter system of claim 1, wherein said control means causes said two power converters to operate 180 degrees out of phase with respect to each other.

28. The flyback power converter system of claim 1, wherein the voltage across each said clamp capacitor has a substantially sinusoidal shape during the OFF state of the power switch with which said clamp capacitor is associated.

29. The flyback power converter system of claim 1, wherein current flowing through said clamp capacitor during the OFF state of the power switch with which said clamp capacitor is associated has a substantially sinusoidal shape.

30. The flyback power converter system of claim 1, wherein current flowing through said clamp capacitor, during the OFF state of the power switch with which said clamp capacitor is associated, has a waveform that corresponds substantially to a half-cycle of a sinusoid.

31. The flyback power converter system of claim 1, wherein each said transformer comprises a magnetizing inductance through which a corresponding magnetizing current flows, and further wherein each said power switch is operated such that said magnetizing current of said magnetizing inductance flows continuously in one direction during successive ON states of each said power switch.

32. A flyback power converter system for providing power to a load, said system comprising:
    an output port for coupling said system to said load; and
    N flyback power converters, where N is an integer greater than two, wherein said N flyback power converters are coupled in parallel to said output port and operated in continuous mode, and further wherein each of said power converters is operated 360/N degrees out of phase with respect to another one of said power converters and each of said power converters comprises:
        an input port for receiving an input voltage;
        a transformer having a primary winding and a secondary winding, wherein a first terminal of said primary winding is coupled to a first terminal of said input port and further wherein a second terminal of said secondary winding is coupled to a second terminal of said output port;

a power switch, said power switch having first and second conduction terminals, wherein voltage across said first and second conduction terminals defines a switch voltage, and further wherein said first conduction terminal of said power switch is coupled to a second terminal of said primary winding and said second conduction terminal of said power switch is coupled to a second terminal of said input port, said power switch being switched to alternating ON and OFF states, wherein power is coupled from said input port to said primary winding during said ON states and wherein substantially no power is coupled from said input port to said primary winding during said OFF states, said transformer storing energy during said ON states and releasing energy to the output port during said OFF states, further wherein said switch voltage is substantially zero volts when said power switch is switched to said ON state from said OFF state;

a series combination of a clamp capacitor and a clamp switch, said series combination having one terminal coupled to the first terminal of said input port and the first terminal of said primary winding, said series combination having a second terminal coupled to said second terminal of said primary winding, said clamp switch having an auxiliary ON state and an auxiliary OFF state; and a rectifier, wherein a first terminal of said rectifier is coupled to a first terminal of said secondary winding and a second terminal of said rectifier is coupled to a first terminal of said output port such that current is substantially blocked from flowing from said output port to said secondary winding during said ON states of the power switch and is enabled to flow to said output port during said OFF states;

said system further comprising:

an output capacitor coupled to said output port; and control means coupled to each of said clamp switches and each of said power switches for switching said power and clamp switches between said ON and OFF states and said auxiliary ON and OFF states, respectively.

* * * * *